Figure 1:
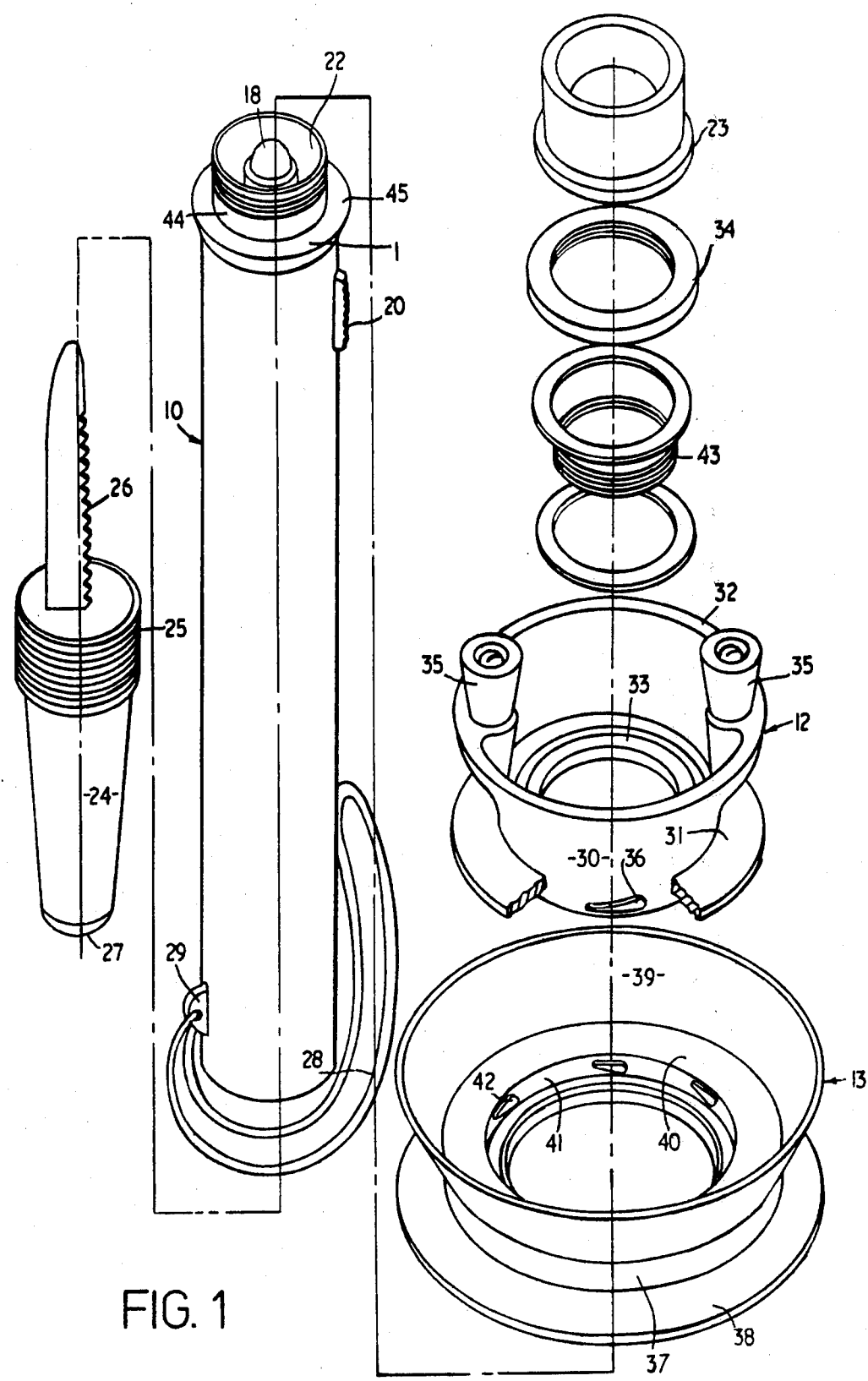

United States Patent [19]

Lapinski

[11] 4,048,743

[45] Sept. 20, 1977

[54] HAND CASTER

[75] Inventor: Richard Lapinski, Fairfield West, Australia

[73] Assignee: Catuma Pty. Limited, Fairfield, Australia

[21] Appl. No.: 660,389

[22] Filed: Feb. 23, 1976

[30] Foreign Application Priority Data

Apr. 23, 1975 Australia .................... 80490/75

[51] Int. Cl.$^2$ .......................................... A01K 87/00
[52] U.S. Cl. ...................................... 43/17.5; 43/18 R
[58] Field of Search ............... 43/17.5, 18 R, 42.09

[56] References Cited

U.S. PATENT DOCUMENTS

| 2,573,399 | 10/1951 | Cannon | 43/42.09 |
|---|---|---|---|
| 2,684,550 | 7/1954 | Reid | 43/18 R |
| 3,528,188 | 9/1970 | Manross | 43/17.5 |
| D. 117,000 | 3/1956 | Ayers | 43/17.5 X |

*Primary Examiner*—Louis G. Mancene
*Assistant Examiner*—Daniel J. Leach
*Attorney, Agent, or Firm*—Holman & Stern

[57] ABSTRACT

A hand caster for fishing having a rotatably frictionally tensioned casting head and a light emitting means with at least one battery disposed in the tubular handle thereof. A reversible knife blade is disposed in the end of the handle opposite the light emitting means and casting head. A second casting head can be coaxially operatively mounted. The casting heads are translucent.

9 Claims, 2 Drawing Figures

HAND CASTER

The present invention relates to a hand caster for use by fishermen, and more particularly to a hand caster which is formed integrally with a light emitting means and/or which is inter-connectable with a further hand caster. Fishermen often operate at night and the usefulness of light emitting means under such circumstances is self evident. It is inconvenient for a fisherman to carry a torch with him as a separate piece of equipment, and it is often difficult to hold the torch as well as bait a hook or some like operation. The arrangement according to the present invention provides a working interconnection between a hand caster and a light emitting means of the torch type by so interconnecting the caster and the light that the light will act as a handle for the caster and so that the illuminated caster forms a marker indicating the position of the caster should it be left unattended at night. The present invention consists in a hand caster comprising a casting head of the type defined, a tubular handle extending axially of, and away from, the abutment side of the casting head, the tubular handle being adapted to house a battery or batteries which are connectable to light emitting means disposed substantially within the plane of the casting head.

Hand casters of the type to which the present invention relates comprise a casting head having an annular body having formed about its periphery, at, or adjacent, one end, a substantially radially directed abutment and having formed about its periphery, at, or adjacent, its other end, a flange extending in a direction away from the abutment and outwardly from the annular body at an acute angle to the longitudinal axis thereof.

In a further aspect the present invention relates to a hand caster which is connectable to a corresponding hand caster of a larger or smaller size. This arrangement allows fishing lines of different breaking strains or "weights" to be wound onto separate hand casters and for the casters to be connected together for ease of handling, transport and storage.

In this further aspect the present invention consists in a hand caster of the type defined having formed thereon attachment means adapted for attachment to a correspondingly formed hand caster of a size larger or smaller than that of the said hand caster.

In a still further aspect this invention comprises a first hand caster having formed thereon first attachment means, the first attachment means being releasably connected to a second attachment means on a second hand caster, the first and second hand casters being of different diameters and the first and second attachment means being so arranged that the hand casters are nested one within the other.

Figure 2:
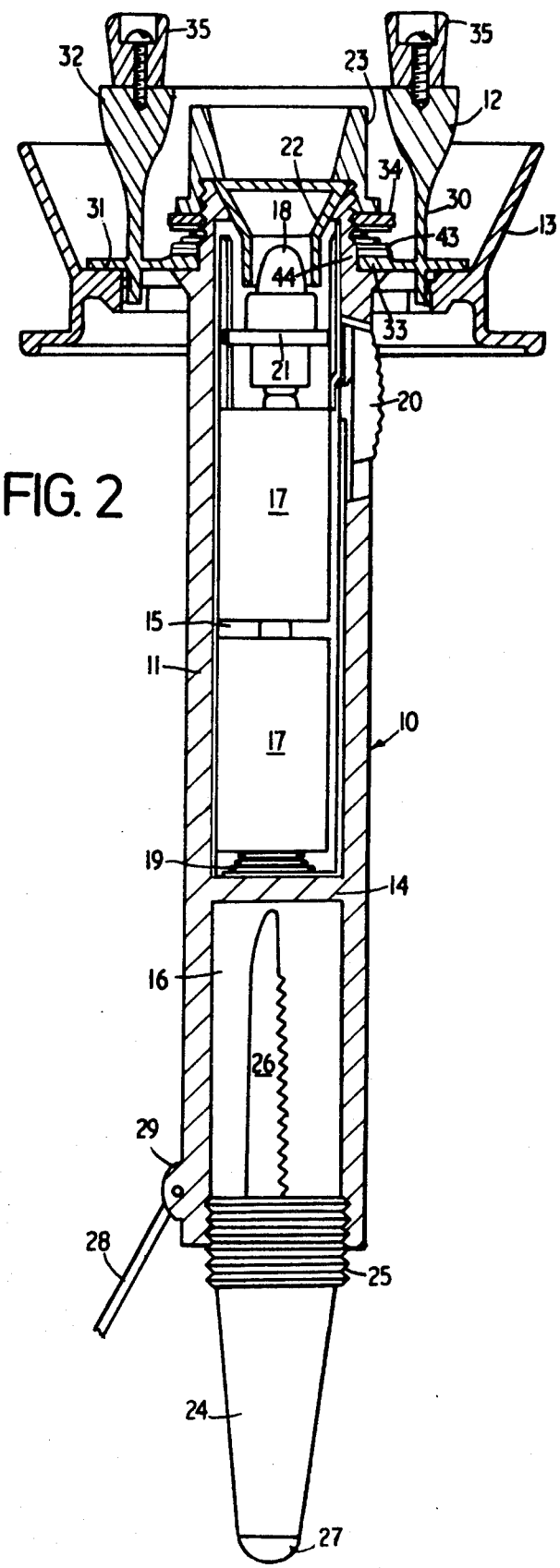

Hereinafter given by way of example only is a preferred embodiment of the present invention described with reference to the accompanying drawings in which:

FIG. 1 is an exploded view of a hand caster according to the present invention, and FIG. 2 is a longitudinal sectional view of the hand caster of FIG. 1.

The hand caster 10 comprises a handle 11 containing lighting means, a first casting head 12 rotatably mounted on the handle, and a second casting head 13 releasably connected to the first casting head 12.

The handle 11 comprises an elongate tube divided intermediate its length by a web 14 which divides the tube into two compartments 15 and 16. The compartment 15 contains a plurality of dry cell batteries 17 which are urged towards a light globe 18 by a spring 19. Switching means 20 is provided to electrically interconnect the batteries 17 and the light globe 18. The globe 18 is mounted within a housing 21 and is surrounded by a reflector 22 held in place on the open end of the compartment 15 by an internally threaded cap 23 which screws onto an externally threaded end portion of the compartment 15.

The open end of the compartment 16 is internally threaded. A hollow boss 24 having an externally threaded portion 25 is screwed into the end of compartment 16. A knife blade 26 is formed integrally with boss 24. The end of the boss 24 distal to the knife blade is closed by a removable cap 27. The removal of the cap 27 allows access to the hollow interior of the boss 24 for storage of hooks, sinkers or the like. The threaded portion 25 of the boss 24 is so arranged that the boss may be reversed and screwed into the end of compartment 16 with the knife blade 26 protruding outwardly of the handle 11.

A carrying strap 28 is connected to the lug 29 which is disposed on the handle 11 adjacent the free end of compartment 16.

The first casting head 12 comprises an annular body part 30 having a radially extending abutment 31 adjacent one end and a casting flange 32 at the other end. The flange 32 is angled outwards from the body part 30 at an acute angle relative to the longitudinal axis of the body parts 30. A radially inwardly directed annular flange 33 is provided on the body part 30. The first casting head 12 is rotatably mounted on collar 44 at the free end of compartment 15; the casting head being positioned between the flange 45 and clutch spring 43, the force of which on the flange 32 is controlled by the locking washer 34 and cap 23. The aperture defined by the flange 33 is of sufficient size to allow the first casting head 12 to be freely rotated about the handle 11; knobs 35 are provided on the flange 32 to assist in this rotation. The free end of the body part 30 of the first casting head 12 which is adjacent the abutment 31 is provided with upstanding wedges 36 which form the male portion of a bayonet joint releasably interconnecting the first and second casting heads 12 and 13.

The second casting head 13 is of essentially similar form to the first casting head having a body part 37 and abutment 38, a casting flange 39 and a radially inwardly directed flange 40. The radially inwardly directed flange 40 is provided on its radially inner surface 41 with wedges 42 which form the female portion of the bayonet joint interconnecting the first and second casting heads.

In use, a fishing line is disposed on the first casting head 12 and the line cast from the casting head in the conventional way with the exception that the hand caster will be held by handle 11. If a different "weight" line is to be used the first line is wound onto the first casting head and second casting head wound with a line of appropriate "weight" can be slid along handle 11 into a nesting relationship with the first casting head 12 and connected to it by means of the bayonet joint.

It will be noticed that, as the second casting head 13 is slid along the handle 11 before connection to the first casting head 12, if the connection between the casting heads were to break the second casting head 13 would not be lost but would be retained on handle 11.

If the hand caster is to be used at night the switch 20 can be activated to illuminate the globe 18. The arrangement of the light within the handle allows the hand caster to be stood upright with its lower end in sand or between rocks to illuminate such operations as baiting a hook or taking a fish off a hook. It is preferred that the casting heads are of a translucent material such that if the hand caster is planted in the sand or on rocks at night and the light switch activated the casting heads will be illuminated and act as a marker beacon marking the position of the hand caster. This arrangement allows the hand caster to be used at night with a set line.

It will be appreciated that the hand caster according to the invention could be made from any suitable material. It is, however, preferred to form the hand caster from a synthetic plastic material.

I claim:

1. A hand caster comprising a tubular handle, having two ends at least one battery disposed within said handle,
    a light emitting means mounted on one end of said tubular handle being electrically operatively associated with said at least one battery,
    abutment means comprising an annular flange on said one end of said tubular handle coaxially surrounding said light emitting means,
    a casting head rotatably coaxially mounted on said annular flange, and engagement means adjustably frictionally holding said casting head on said annular flange.

2. The hand caster as claimed in claim 1 in which the casting head is translucent.

3. The hand caster as claimed in claim 1 further comprising attachment means adapted for attachment to a correspondingly formed hand caster of a size larger or smaller than that of the said hand caster.

4. A first hand caster having formed thereon first attachment means, the first attachment means being releasably connected to second attachment means on a second hand caster, the first and second hand casters being of different diameters and the first and second attachment means being so arranged that the hand casters are nested one within the other.

5. The hand caster as claimed in claim 4 wherein the attachment means comprise a bayonet joint or one component thereof.

6. The hand caster as claimed in claim 4 in which the attachment means, or the first attachment means, are mounted on the body part, or on the abutment, of the casting head.

7. The hand caster as claimed in claim 4, in which the attachment means or the second attachment means are mounted on a flange which extends radially inwardly from the body part of the casting head.

8. The hand caster as claimed in claim 1, further comprising a knife having a blade is mounted in the other end of said tubular handle in such a manner that the knife may be transposed between a position in which the blade thereof is disposed within the handle and a position in which the blade extends axially of the handle.

9. The head caster as claimed in claim 1, wherein said angagement means comprises threading on said one end of said tubular handle, a threaded nut, and a spring washer, said nut engaging the threads on said tubular handle adjustably tensionally holding said spring washer and said casting head against said annular flange.

* * * * *